(12) United States Patent
Schuller et al.

(10) Patent No.: US 8,414,276 B2
(45) Date of Patent: Apr. 9, 2013

(54) PISTON PUMP FOR A VEHICLE BRAKE SYSTEM WITH A SEALING ELEMENT

(75) Inventors: Wolfgang Schuller, Cleebronn (DE); Marc Zimmermann, Oberstenfeld (DE)

(73) Assignee: Robert Bosch GmbH, Stuttgart, DE (US)

( * ) Notice: Subject to any disclaimer, the term of this patent is extended or adjusted under 35 U.S.C. 154(b) by 0 days.

(21) Appl. No.: 12/304,143

(22) PCT Filed: May 22, 2007

(86) PCT No.: PCT/EP2007/054956
§ 371 (c)(1),
(2), (4) Date: Dec. 10, 2008

(87) PCT Pub. No.: WO2008/000557
PCT Pub. Date: Jan. 3, 2008

(65) Prior Publication Data
US 2009/0220363 A1     Sep. 3, 2009

(30) Foreign Application Priority Data
Jun. 27, 2006  (DE) .......................... 10 2006 029 368

(51) Int. Cl.
*F04B 39/10* (2006.01)
*F04B 53/12* (2006.01)
(52) U.S. Cl. ........................................... 417/545
(58) Field of Classification Search ................. 417/470, 417/540, 552, 545, 549, 553, 554; 91/240; 92/249
See application file for complete search history.

(56) References Cited

U.S. PATENT DOCUMENTS

| | | | | |
|---|---|---|---|---|
| 5,823,639 A | * | 10/1998 | Zinnkann et al. | 303/116.4 |
| 6,146,115 A | * | 11/2000 | Alaze | 417/549 |
| 6,171,083 B1 | * | 1/2001 | Schuller | 417/549 |
| 6,276,909 B1 | * | 8/2001 | Siegel et al. | 417/549 |
| 6,327,964 B1 | * | 12/2001 | Schuller et al. | 92/248 |
| 6,341,950 B1 | * | 1/2002 | Schuller et al. | 417/554 |
| 6,361,295 B2 | * | 3/2002 | Schuller et al. | 417/549 |
| 6,514,056 B1 | * | 2/2003 | Schuller et al. | 417/549 |
| 6,786,232 B2 | * | 9/2004 | Schuller et al. | 137/543.17 |
| 2001/0002978 A1 | * | 6/2001 | Siegel et al. | 417/470 |
| 2004/0234400 A1 | | 11/2004 | Schepp et al. | |
| 2006/0198738 A1 | | 9/2006 | Schlitzkus et al. | |

FOREIGN PATENT DOCUMENTS

| | | |
|---|---|---|
| JP | 2004124850 A | 4/2004 |
| WO | 03004872 A1 | 1/2003 |
| WO | 2004088137 A1 | 10/2004 |
| WO | 2006013142 A1 | 2/2006 |

* cited by examiner

*Primary Examiner* — Devon Kramer
*Assistant Examiner* — Amene Bayou
(74) *Attorney, Agent, or Firm* — Maginot, Moore & Beck

(57) ABSTRACT

The invention relates to a piston pump for a vehicle braking system, with a housing section and a piston, which is guided in the housing section in a slidable manner. An accommodating member for accommodating an intake valve is provided in the housing section, and a sealing element adjoins the accommodating member to seal the piston against the housing section. A piston rod adjoins the sealing element which is embodied in one piece with the accommodating member.

18 Claims, 2 Drawing Sheets

PISTON PUMP FOR A VEHICLE BRAKE SYSTEM WITH A SEALING ELEMENT

CROSS-REFERENCE TO RELATED APPLICATION

This application is a 35 USC 371 application of PCT/EP 2007/054956 filed on May 22, 2007.

BACKGROUND OF THE INVENTION

1. Field of the Invention

The invention relates to a piston pump for a vehicle brake system, having a housing section and a piston that is guided displaceably in the housing section, a receiving element for receiving an inlet valve, a sealing element adjoining the receiving element for sealing off the piston from the housing section, and a piston rod adjoining the sealing element.

2. Description of the Prior Art

The piston pumps for known vehicle brake systems, in particular anti-lock systems (ABS), serve to control the pressure in wheel brake cylinders. In the ABS, the piston pumps are intended for instance for returning brake fluid from one or more wheel brake cylinders to a master cylinder. Often, the ABS functions in combination with traction control (TC). Another known system, the electronic stability program (ESP), improves driving safety by a further increment compared to ABS and TC. While ABS and TC act in the longitudinal travel direction, ESP affects the transverse dynamics and in principle is therefore transverse traction control. For all these systems and for other systems for increasing driving safety, piston pumps are used.

Known piston pumps intended for vehicle brake systems comprise among other things a cylinder, which is embodied in a housing and in which a piston is received longitudinally movably. The piston drive is usually effected by an eccentric drive, in which the rotary motion of a shaft driven by a drive motor is converted to a translational motion of the piston. In the process, the piston rod is pressed with its face end against the outer circumference of the eccentric element of the eccentric drive by a prestressing element, for instance in the form of a helical spring. Thus in the final analysis, a reciprocating pumping motion of the piston can be attained.

Moreover, known piston pumps, to control the fluid inflow, have an inlet valve embodied as a seat valve; in the cylinder, between the inlet valve and the piston, a sealing element is also provided, which is guided longitudinally movably in the cylinder. The piston of known piston pumps is mounted with its face end, disposed inside the cylinder, on the sealing element, so that a reciprocating piston motion is transmitted directly to the sealing element. On the end of the sealing element toward the inlet valve, a valve seat of the inlet valve embodied as a seat valve is embodied, and for the fluid inflow, a bore extending through the sealing element is provided, which extends as far as the valve seat, so that fluid flows through the inlet valve that is open in the intake phase. The barrier body of the inlet valve embodied as a seat valve is pressed via a spring element against the valve seat embodied on the sealing element, and the barrier body, the spring element, and the end, embodied as a valve seat, of the sealing element are received in a receiving element in the form of an inlet valve cap. The inlet valve cap serves as a brace for the spring element and as a guide for the barrier body. Around the inlet valve cap, there is a prestressing element in the form of a helical spring, which presses against a bracing body embodied on the inlet valve cap that is received in a recess embodied in the sealing element, in order to transmit the spring force, transmitted to the bracing body, to the piston mounted on the sealing element by way of the sealing element. In this way, prestressing can in the final analysis be transmitted to the piston, in order to press the piston against the eccentric element of the eccentric drive.

Thus viewed overall, many pump components are disposed in the cylinder of known piston pumps. As a consequence, assembling and disassembling know piston pumps is comparatively complex. Moreover, because of the many pump components provided, known piston pumps cannot be manufactured especially economically.

OBJECT AND SUMMARY OF THE INVENTION

The object of the invention is to disclose a piston pump for a vehicle brake system that can be assembled and disassembled with little effort or expense and that can furthermore be manufactured economically.

This object is attained according to the invention with the piston pump, recited at the outset, for a vehicle brake system in which the sealing element is embodied in one piece with the receiving element.

According to the invention, the sealing element is embodied in one piece with the receiving element. This has the advantage that unlike the piston pumps known from the prior art, the functions of the sealing element and of the receiving element serving to receive the inlet valve are taken on by only a single component. Thus according to the invention, compared to the known embodiments, one less component is used, and as a consequence, the assembly and disassembly of the piston pump of the invention can be done very simply, and the chain of tolerances is reduced markedly. Moreover, by using one less component according to the invention, the manufacturing costs for the piston pump can be reduced markedly. Finally, because it uses one less component, the piston pump of the invention can be markedly smaller than known pumps.

In an advantageous refinement of the invention, the inlet valve has a valve seat, which is embodied on the piston rod. This structural embodiment according to the invention makes simple assembly and disassembly of the piston pump possible. Thus particularly for disassembling the piston pump, the piston rod adjoining the sealing element has to be removed from the sealing element. Next, the inlet valve, which is preferably embodied as a seat valve, can be removed together with its individual components, including in particular a barrier body and a spring element, without major effort or expense from the receiving element embodied in one piece with the sealing element. Finally, the sealing element, which is received longitudinally movably in the cylinder of the piston pump and on which the receiving element is embodied in one piece, can be removed from the cylinder without problems.

In a further advantageous refinement of the invention, a prestressing element, preferably in the force of a helical spring, is provided, which rests on the sealing element and with which the piston is forced in the direction out of the housing section. The prestressing force transmitted from the prestressing element to the sealing element always retains the piston in an outer position. In this way, according to the invention, the outer face end of the piston can be pressed against the eccentric element of an eccentric drive, in order to convert a translational driving motion, furnished by the eccentric drive, into a reciprocating pumping motion of the piston. By means of the prestressing element, the piston pump of the invention can be used in conjunction with eccentric drives, which are preferably used in brake systems for driving the piston pumps.

In a practical refinement of the invention, the sealing element is embodied in the form of a sealing ring with a sealing ring opening, and the piston rod is received in the sealing ring opening, and preferably the piston rod is received in the sealing ring opening with a clearance fit. By means of a clearance fit, the piston rod can be centered in the sealing ring opening without problems. Moreover, a clearance fit makes a requisite problem-free release of the piston rod from the sealing ring opening for disassembly purposes possible.

In a further advantageous refinement of the invention, a snap connection is embodied between the sealing element and the piston rod, for premounting the piston rod on the sealing element. The snap connection, which is preferably embodied on the sealing element, for instance embraces a shoulder embodied on the piston rod. By the snap connection according to the invention, during the assembly of the piston pump and in particular during the assembly on the cylinder, the piston rod can be held on the sealing element by way of the snap function furnished according to the invention. Moreover, by the snap connection according to the invention, the inner wall of the cylinder is protected from the outer diameter of the piston. By the snap connection of the invention, any contact of the piston with the inner wall of the cylinder is precluded so that damage to the inner wall of the cylinder or the piston is avoided.

BRIEF DESCRIPTION OF THE DRAWINGS

Exemplary embodiments of a piston pump of the invention are described in further detail below in conjunction with the appended schematic drawings.

DESCRIPTION OF THE PREFERRED EMBODIMENT

Figure 1:
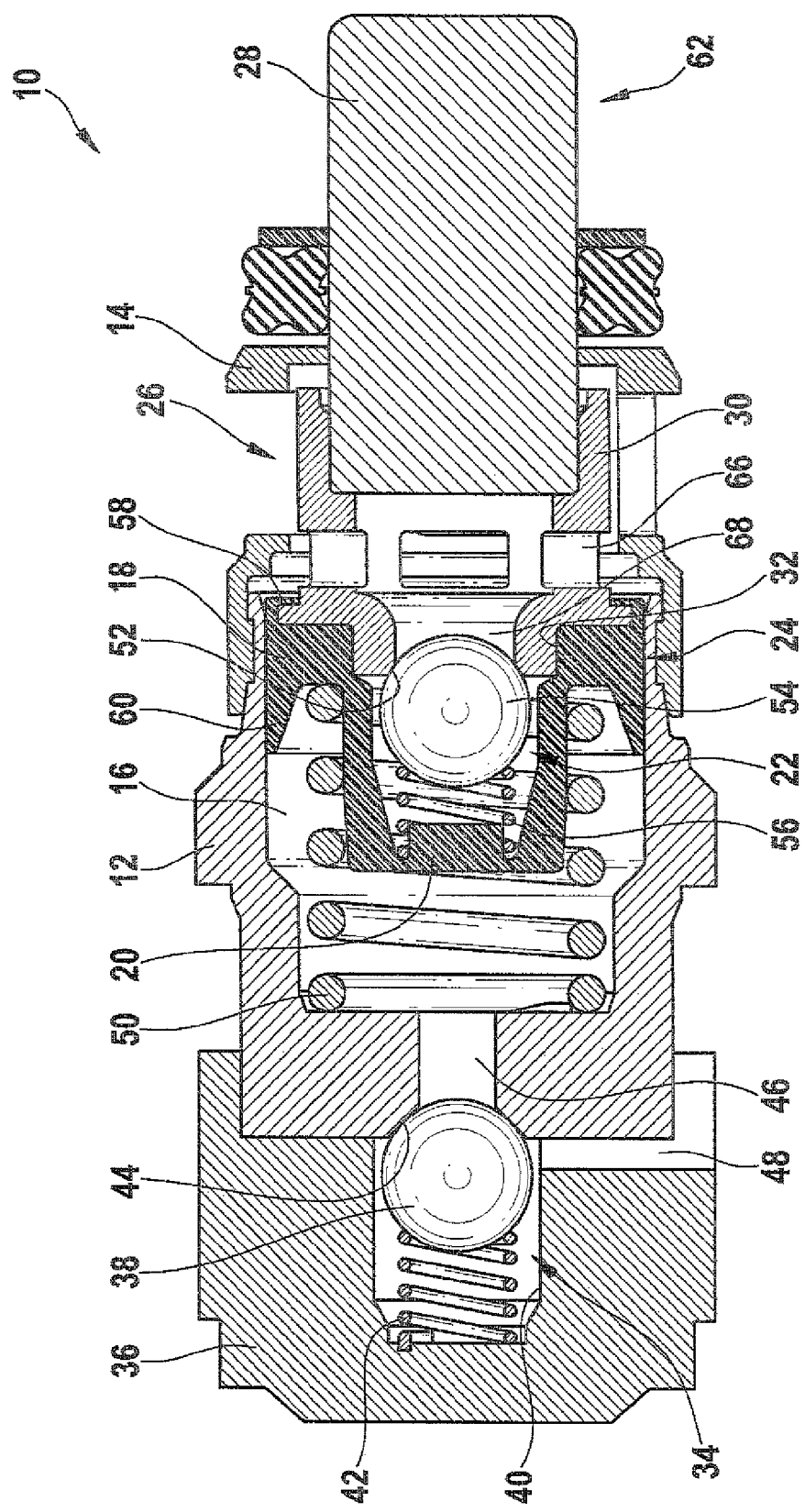
FIG. 1 is a longitudinal section through a piston pump of the invention.

FIG. 1 shows a piston pump 10 according to the invention. The piston pump 10 includes two housing sections 12 and 14, and in the housing section 12, a cylinder bore 16 is embodied, in which a piston 26 is displaceably guided. The piston 26 includes a sealing element in the form of a sealing ring 18, a receiving element 20 for an inlet valve 22 that is embodied as a ball seat valve and is embodied in one piece with the sealing ring 18 and in the present case as an inlet valve cap, and a piston rod 62 that adjoins the sealing ring 18. The piston rod 62 is embodied in two parts and includes two piston rod elements 28, 30; the piston rod element 28 is received firmly in the piston rod element 30 by means of a press fit, in order to create a connection by nonpositive engagement between the two piston rod elements 28, 30. Because of the two-part embodiment of the piston rod 62 as provided, a piston rod 62 that can be manufactured economically is attained, since according to the invention, an economical rodlike piston rod element 28 is connected to a piston rod element 30 that can be furnished extremely economically, in the form of a plastic injection-molded part, a part turned on a lathe, a cast part, or a cold-forged part.

The receiving element 20 designed as an inlet valve cap and the sealing ring 18 together form a one-piece valve cap/sealing ring combination 24. The piston rod element 30, for connecting the piston rod 62 to the sealing ring 18, is received in the sealing ring opening 32 of the sealing ring 18.

The piston pump 10 furthermore has an outlet valve 34, embodied as a ball seat valve, which is disposed inside an outlet valve cap 36, and the ball 38 of the ball seat valve 34 is guided in a receptacle 40 embodied in the outlet valve cap 36. The outlet valve cap 36 may be manufactured partially by metal-cutting machining or cold-forging. A helical spring 42 braced on the cap bottom presses the ball 38 against a valve seat 44, which is embodied in the housing section 12 of the piston pump 10 and which adjoins an outlet hole 46 embodied in the housing section 12. Brake fluid flowing from the outlet hole 46 through the outlet valve 34 flows in the direction of the pump outlet (not shown) via a radial conduit 48 between the outlet valve cap 36 and the housing section 12.

A prestressing element in the form of a helical spring 50 is also disposed in the cylinder bore 16 embodied in the housing section 12; it rests with one end on the sealing ring 18 and is braced with its other end on the bottom of the housing section 12. The helical spring 50 is subjected to prestressing, in order to press the two-part piston rod 62 against the circumference of the eccentric element of an eccentric drive (not shown), via the sealing ring 18 on which the piston rod 62 rests with its face end disposed inside the piston pump 10. Thus the outer face end of the piston rod element 28 can be kept in constant contact with the eccentric element. By driving the eccentric element to rotate, the entire piston 26 is driven to an axially reciprocating stroke motion, which in a known manner causes pumping of brake fluid.

The valve seat 52 of the ball inlet valve 22, which seat can be produced for instance by ball stamping, is embodied on its face end on the piston rod element 30. This embodiment according to the invention of the valve seat 52 on the piston rod element 30 of the piston rod 62, in conjunction with the one-piece embodiment of the sealing ring 18 according to the invention, with the receiving element 20 designed as an inlet valve cap, in the form of the valve cap/sealing ring combination 24, offers pronounced advantages in the assembly and disassembly of the piston pump 10. For disassembly of the piston pump 10, the piston rod element 30, received in the sealing ring opening 32 with a clearance fit, should be pulled out of the sealing ring opening 32. The clearance fit provided according to the invention makes problem-free release of the piston rod element 30 from the sealing ring 18 possible here. The individual components of the seat valve 22, that is, the ball 54 and the helical spring 56, can then easily be removed from the receiving element 20. Finally, after the one-piece valve cap/sealing ring combination 24 is pulled out of the cylinder bore 16, the helical spring 50 can be removed from the cylinder bore 16. The assembly of the piston pump 10 is correspondingly simply designed; the clearance fit provided enables problem-free centering of the piston rod element 30 in the sealing ring opening 32.

A snap connection in the form of a snap lug 58, which embraces a shoulder embodied on the piston rod element 30, is also embodied on the sealing ring 18. By means of the snap lug 58, the piston rod 62 can be retained on the sealing ring 18 during the assembly of the piston pump 10, and in particular during the assembly in the cylinder bore 16, thereby simplifying the assembly of the piston pump 10 of the invention substantially. The retention function thus attained according to the invention can alternatively be attained by means of a thermal deformation after the valve cap/sealing ring combination 24 has been slipped onto the piston rod element 30. According to the invention, the snap lug 58 takes on only the described retention function, which is advantageous for assembly purposes. During the operation of the piston pump 10, the spring force of the helical spring 50 assures that the valve cap/sealing ring combination 24 rests permanently in the axial direction on the piston rod element 30, despite the clearance fit that is advantageous for assembly purposes. Moreover, the snap lug 58 has a protective action between the cylinder bore 16 and the piston rod element 30. On the sealing ring 18 of the valve cap/sealing ring combination 24, a sealing lip 60 is also embodied, which closes off the cylinder chamber between the piston 26 and the cylinder bore 16 radially in pressure-tight fashion.

Finally, the piston pump 10 has a radial bore 66, embodied in the piston rod element 30, and a central axial bore 68, through which fluid from outside the piston pump can flow through the inlet valve 22.

Figure 2:
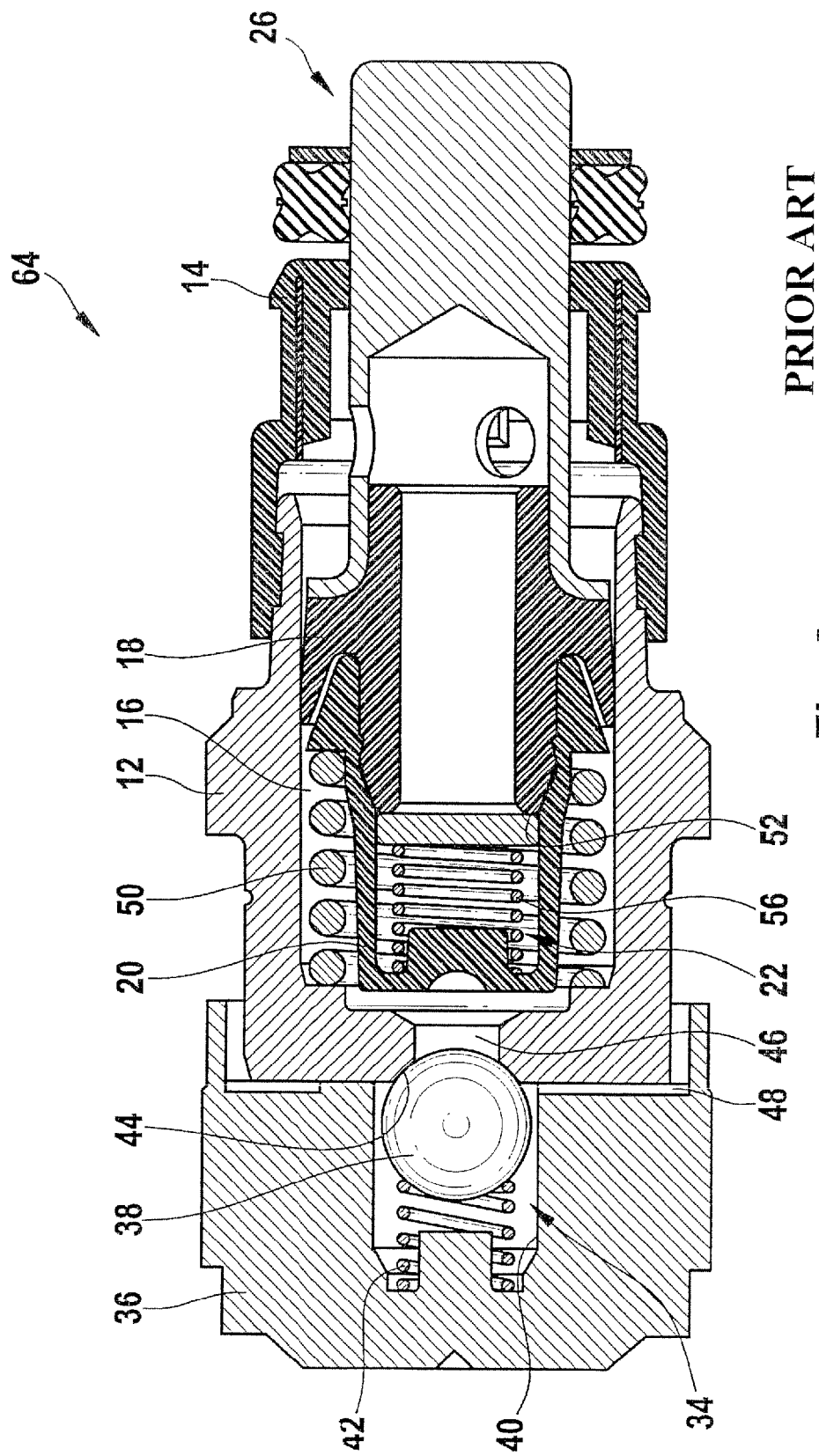
FIG. 2 is a longitudinal section through a piston pump of the prior art.

FIG. 2 shows a sectional view of a piston pump 64 of the prior art. Unlike the piston pump 10 of the invention, in the known piston pump 64, the receiving element 20 and the sealing ring 18 in particular are separate components, which makes the disassembly and assembly of the known piston pump 64 markedly more difficult and, unlike the piston pump 10 of the invention, involves a longer chain of tolerances. Moreover, no contact protection between the cylinder bore 16 and the piston 26 is provided.

The foregoing relates to the preferred exemplary embodiment of the invention, it being understood that other variants and embodiments thereof are possible within the spirit and scope of the invention, the latter being defined by the appended claims.

The invention claimed is:

1. A piston pump for a vehicle brake system, comprising:
   a housing;
   a receiving element for receiving an inlet valve, the receiving element being positioned in the housing;
   a sealing ring positioned in the housing, the sealing ring adjoining the receiving element and configured to contact an interior surface of the housing, and the sealing ring (i) defining an inner surface, and (ii) having a radially extending snap lug defining a circumferential groove defined by the inner surface; and
   a piston rod positioned in the housing, the piston rod adjoining the sealing ring,
   wherein the piston rod has a first piston end defining a valve seat and a second piston end defining a contact surface configured to contact an eccentric element of an eccentric drive,
   wherein the piston rod includes (i) a first piston rod element that includes the first piston end, and (ii) a second piston rod element that includes the second piston end,
   wherein the first piston rod element defines an interior space configured to receive a portion of the second piston rod element therein,
   wherein the first piston rod element further includes a radially extending shoulder disposed between the first piston end and the second piston end,
   wherein the sealing ring is formed in one piece with the receiving element, and
   wherein the shoulder engages the snap lug within the groove to provide a snap connection between the sealing ring and the piston rod for premounting the piston rod on the sealing ring.

2. The piston pump as defined by claim 1, wherein the inlet valve has a valve seat on the piston rod.

3. The piston pump as defined by claim 1, further comprising a prestressing element which rests on the sealing ring and with which the piston is forced in a direction of the contact surface.

4. The piston pump as defined by claim 2, further comprising a prestressing element which rests on the sealing ring and with which the piston is forced in a direction of the contact surface.

5. The piston pump as defined by claim 1, wherein the sealing ring defines a sealing ring opening, and the piston rod is received in the sealing ring opening.

6. The piston pump as defined by claim 2, wherein the sealing ring defines a sealing ring opening, and the piston rod is received in the sealing ring opening.

7. The piston pump as defined by claim 3, wherein the sealing ring defines a sealing ring opening, and the piston rod is received in the sealing ring opening.

8. The piston pump as defined by claim 5, wherein the piston rod is received in the sealing ring opening with a clearance fit.

9. The piston pump as defined by claim 6, wherein the piston rod is received in the sealing ring opening with a clearance fit.

10. The piston pump as defined by claim 7, wherein the piston rod is received in the sealing ring opening with a clearance fit.

11. The piston pump as defined by claim 3, wherein the prestressing element is a helical spring disposed in a cylindrical bore in the housing.

12. The piston pump as defined by claim 1, wherein the sealing ring has a sealing lip which closes off a cylindrical chamber between the piston and a cylindrical bore in the housing in radially pressure-tight fashion.

13. The piston pump as defined by claim 1, wherein the first piston rod element and the second piston rod element are connected to each other by a press fit in order to create a connection by nonpositive engagement therebetween.

14. The piston pump as defined by claim 1, wherein the receiving element is embodied as an inlet valve cap.

15. The piston pump as defined by claim 1, wherein the snap lug provides a protective action between a cylindrical bore of the housing and the piston rod.

16. The piston pump as defined by claim 1, wherein the piston rod has a radial bore and a central axial bore through which fluid from outside the piston pump can flow through the inlet valve.

17. The piston pump as defined by claim 1, wherein an outlet valve embodied as a ball valve seat valve is disposed inside an outlet valve cap and a ball of the ball seat valve is guided in a receptacle in the outlet valve cap.

18. A piston pump for a vehicle brake system, comprising:
   a housing section;
   a piston guided displaceably in the housing section;
   a receiving element for receiving an inlet valve;
   a sealing ring adjoining the receiving element that seals off the piston from the housing section, the sealing ring having a radially extending snap lug defining a circumferential groove disposed on an inner surface; and
   a piston rod adjoining the sealing ring, the piston rod having a first piston rod element securely received within a second piston rod element, the second piston rod element having a radially extending shoulder disposed between a first end and a second end and a valve seat disposed on the first end,
   wherein the sealing ring is formed in one piece with the receiving element, and
   wherein the shoulder engages the snap lug within the groove to provide a snap connection between the sealing ring and the piston rod for premounting the piston rod on the sealing ring.

* * * * *